2 Sheets—Sheet 1.

G. F. SMITH.

Assignor, by mesne assignments, of three-fourth interest to C. W. Woods. H. C. Smith & A. R. Colborn.

Refrigerator.

No. 8,463. Reissued Oct. 22, 1878.

*Witnesses:*

C. Clarence Poole.
R. T. Dyer

*Inventor*

George F. Smith
by Geo W. Dyer & Co
Attys

2 Sheets—Sheet 2.

G. F. SMITH.

Assignor, by mesne assignments, of three-fourth interest to C. W. Woods, H. C. Smith & A. R. Colborn.

Refrigerator.

No. 8,463. Reissued Oct. 22, 1878.

*Witnesses:*

C. Clarence Poole

R. A. Dyer.

*Inventor:*

George F. Smith by Geo W. Dyer & Co

Attys.

UNITED STATES PATENT OFFICE.

GEORGE F. SMITH, OF MICHIGAN CITY, INDIANA, ASSIGNOR, BY MESNE ASSIGNMENTS, OF THREE-FOURTHS INTEREST TO C. W. WOODS, H. C. SMITH, AND ABRAM R. COLBORN.

IMPROVEMENT IN REFRIGERATORS.

Specification forming part of Letters Patent No. 193,563, dated July 24, 1877; Reissue No. 8,463, dated October 22, 1878; application filed July 25, 1878.

*To all whom it may concern:*

Be it known that I, GEORGE F. SMITH, of Michigan City, in the county of La Porte and State of Indiana, have invented a new and useful Improvement in Refrigerators; and I do hereby declare that the following is a full and exact description of the same, reference being had to the accompanying drawings, and to the letters of reference marked thereon.

My invention relates to that class of refrigerators wherein a constant circulation of air is maintained through the ice-box and provision-chambers; and its object is to increase the circulation, reduce the air to a lower temperature than heretofore, and to deliver such air into the provision-chambers deprived of all odor and free from moisture, preventing the sides of said provision-chambers from sweating, and better preserving the articles placed therein.

My invention therein consists in the combination of an ice-box of the entire width of the refrigerator except the air-passages at its end, said ice-box having a central air-discharge opening in its bottom, the provision-chambers, and the air-passages leading out of the same; also, in the combination of the same elements and an air-discharge opening above the center of the ice-box; also, in the combination of the ice-box with the central air-discharge opening and a false bottom, raised above the bottom of the ice-box, having openings near its ends and an air-passage under it; also, in the combination of the various principal operative parts, all constructed and arranged as more fully hereinafter explained.

To enable others skilled in the art to manufacture my refrigerator, I proceed to describe the same, having reference to the drawings, in which—

Figure 1:
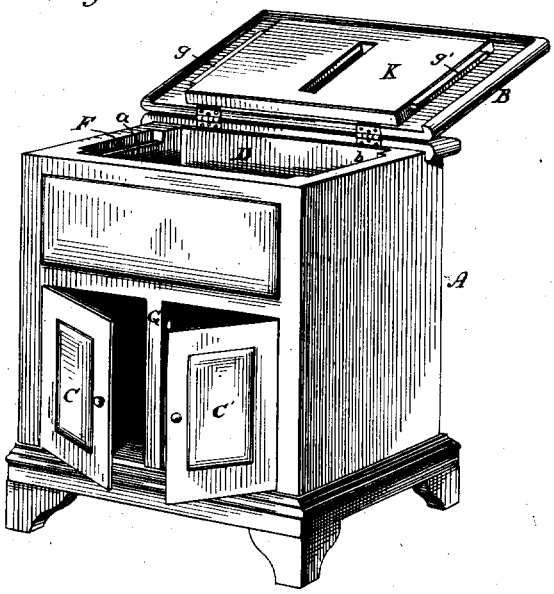
Figure 4:
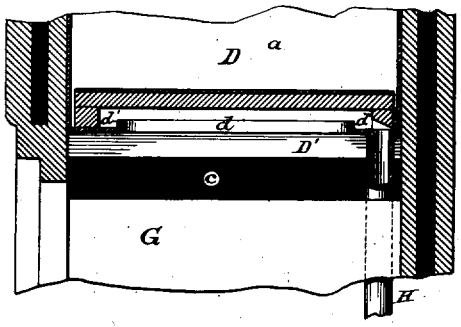
Figure 2:
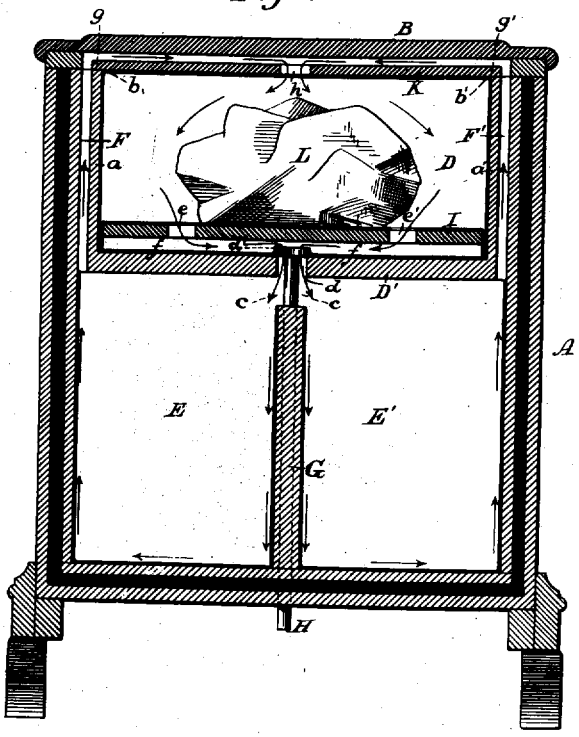
Figure 3:
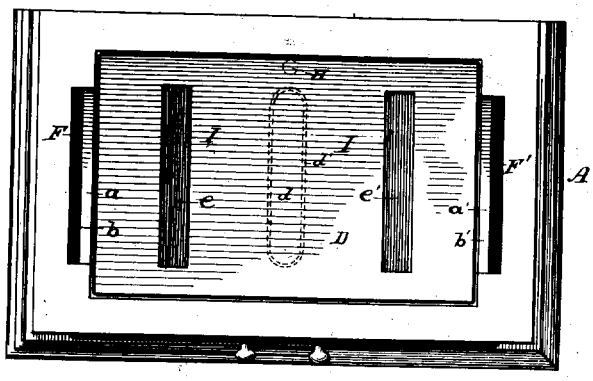

Figure 1 is a perspective view of the refrigerator with the cover thrown open; Fig. 2, a central vertical section of the same with the cover closed; Fig. 3, a plan view of the refrigerator, the top being removed; and Fig. 4, a central vertical section from front to rear of the middle portion of the refrigerator.

Like letters denote corresponding parts in each figure.

A represents the body of the refrigerator, which is constructed with double walls, the space between these walls being filled with non-conducting material, as shown. B is the cover to the ice-box, and C C′ doors opening into the provision-chambers.

In the top of the refrigerator is situated the ice-box D, which occupies the entire upper portion of the refrigerator the width of the provision-chambers, with the exception of the air-passages at the ends of the ice-box, hereinafter shown by the letters F F′, and which is separated from the provision-chambers E E′ below it by a horizontal partition, D′. Both the ice-box and the provision-chambers are lined with zinc in the usual manner. At the ends of the ice-box are thin vertical partitions *a a′*, supported a short distance from the walls of the refrigerator, so as to form between them and such walls air-passages F F′, which lead from the tops of the provision-chambers, and open into the recesses *b b′* in the walls of the refrigerator, as shown in Figs. 1 and 3.

The provision-chambers E E′ are provided with any suitable number of racks, (not shown,) and are separated from each other by a central partition, G, running from the front to the rear of the refrigerator. This partition does not rise quite to the horizontal partition D′, but an open space, *c*, is left at the top of the same, which connects the two provision-chambers. Above this space, in the horizontal partition D′, is cut an opening, *d*, and around the edge of this opening the lining of the ice-box is turned up, as shown at *d′*, to prevent the waste water from running through the same.

H is the waste-pipe, extending from the bottom of the ice-box down through the partition G and out at the bottom of the refrigerator. I is a false bottom, made of wood, and supported above the floor of the ice-box by two or more longitudinal strips. This bottom is covered with a sheet of zinc, and has cut through it, near its ends, two openings, *e e′*, forming under such bottom an air-passage, *f*, leading to the central opening, *d*.

To the under side of the cover B is attached a shallow air-box, K, which hangs down into the ice-box and is covered with zinc. This box is open at the ends the width of the recesses *b b'*, and has strips *g g'*, Figs. 1 and 2, which set into and occupy a part of the space of such recesses, thus cutting them off from the ice-box when the cover is closed, and connecting the air-passages F F' with the air-box. Through the center of the air-box K is cut an opening, *h*, leading into the ice-box. A cake of ice, L, is represented in Fig. 2 in position in the ice-box.

It will be observed from the foregoing description of the construction of the refrigerator, and from inspection of the drawings, that the ice-box occupies substantially the entire upper portion of the refrigerator the width of the provision-chambers beneath it. This construction is deemed important, as thereby not only a large chamber is provided for the reception of ice, but in this chamber there is room for the refrigeration of a large body of air, and, the outlet for the discharge of this air into the provision-chamber being small, all the air is detained in the ice-box chamber until it is perfectly cool. By this construction, also, the air-discharge passage out of the ice-box may be located centrally over the inner sides of the provision-chambers, and the air-passages out of the provision-chambers may be located around the ends of the ice-box and over the outer sides of the provision-chambers.

From this construction and location of the ice-box in reference to the provision-chambers and to the cover with its central air-discharging opening, it is apparent that it permits, first, a central discharge of the heated and vitiated air from the provision-chambers into the upper center of the ice-box; second, that it permits this air, after it is cooled, purified, and dried, to be discharged centrally out of the bottom of the ice-box; third, that this air is discharged into the provision-chambers near the center of the refrigerator; and, fourth, that this air is discharged out of the upper outer sides of the refrigerator at the greatest practicable distance from the inlet, all of which will be now explained in the following description of the mode of operation.

The movements of the air-currents in this refrigerator are shown by arrows in the drawings, and are described as follows: It being understood that the ice-box is properly charged with ice, and that this box and the provision-chambers are filled with air, and that the doors are closed and the cover shut down, it follows that the temperature of the air in the ice-box is immediately reduced by the presence of the ice to a point below the temperature of the air in the provision-chambers. This cooled air at once descends, having a greater specific gravity, finding its way through the air-passages under the false bottom and into the inner upper portions of the provision-chambers. By the pressure of this intruding body of cooled air the warmer air contained in the provision-chambers is forced out of them through the air-passages F F' at the ends of the ice-box and into the connecting air-passages of the air-box of the cover, and thence out through its central opening upon the top of the ice in the ice-box. The air which thus impinges upon the top of the ice is immediately cooled, and, following the current already established, moves over and around the ice and into the air-passages under the false bottom, and is again discharged centrally into the provision-chambers, as before described.

It is apparent that the pressure of the descending cool air into the provision-chambers must principally be on the inner or partition G sides of the chambers and extend quite to the bottom of the same, and that the escape of the warmer air must be upon the outer sides of the provision-chambers, on account of the comparatively small areas of the inlet and outlet passages, which would prevent a direct current from one to the other, from which it follows that all the warmer air in such chambers is constantly swept out by the cooler air which displaces it. This warmer air thus swept out is compressed in the comparatively small and narrow air-passages around the ends of the ice-box, and in the air-box to the cover, and consequently issues with a small rapid current directly upon the top of the ice, where it is instantly dispersed over the ice. In this way not only all the air in the provision-chambers is forced directly into contact with the ice and is at once cooled, but in the act of cooling and by the contact with the ice is purified and deprived of all the odors emitted from the articles in such provision-chambers.

The ice resting centrally upon the false bottom, the circulating air is thrown into contact with the metal covering of the air-box K and against the sides of the ice-box, and the moisture in the same is condensed mostly before it passes through the openings in the false bottom. Then passing along the channel *f*, the moisture in the air is further condensed upon the metal bottom of the ice-box and enters the provision-chambers comparatively dry, thus preventing the sweating of such provision-chambers, and better preserving the articles contained therein. The water caused by this condensation and by the melting of the ice runs into the bottom of the ice-box, and is carried off by the waste-water pipe H, it being prevented from passing through the opening *d* by its upturned edge *d'*.

I do not pretend that I am the first to invent an air-chamber in the cover of a refrigerator, with a central discharge-passage over an ice-box, or that I am the first to invent a false bottom to an ice-box in a refrigerator, and I do not broadly claim the same; but What I do claim as new and of my own invention is—

1. In a refrigerator, the combination of the following elements, viz: an ice-box the width of the provision-chambers, occupying the entire upper portion except spaces at each end for ascending air-currents, a central opening in the bottom of the ice-box, provision-chambers below the ice-box, occupying the entire width, and air-passages out of such chambers around the ends of the ice-box, substantially as and for the purposes set forth.

2. In a refrigerator, the combination of the following elements, viz: an ice-box the width of the provision-chambers, occupying the entire upper portion except spaces at each end for ascending air-currents, an air-discharge opening above the center of the ice-box, a central air-discharge opening in the bottom of the ice-box, and air-passages out of the provision-chambers around the ends of the ice-box, substantially as and for the purposes set forth.

3. In a refrigerator, the combination of the following elements, viz: an ice-box the width of the provision-chambers, occupying the entire upper portion except spaces at each end for ascending air-currents, a central air-discharge opening in the bottom of the ice-box, and a false bottom raised above the bottom of the ice-box, having openings near its ends only, and an air-passage under it, substantially as and for the purposes set forth.

4. In a refrigerator, the combination of the following elements, viz: an ice-box the width of the provision-chambers, occupying the entire upper portion except spaces at each end for ascending air-currents, a central air-discharge opening in the bottom of the ice-box, and a partition directly under such opening, dividing the air-currents as well as the provision-chambers and air-passages out of the provision-chambers around the ends of the ice-box, substantially as and for the purposes set forth.

5. In a refrigerator, the combination, with the two provision-chambers E E′ and the single ice-box D, provided with openings *d*, and situated above such provision-chambers and extending the entire width of the refrigerator, of the side flues, F F′, air-box K, having openings *h*, and the false bottom I, having the side openings, *e e′*, all constructed and arranged substantially as described and shown.

GEORGE F. SMITH.

Witnesses:
H. M. HOPKINS,
C. S. GOODHUE.